United States Patent

[11] 3,583,563

| [72] | Inventor | Hendrikus Gerhardus Muller<br>Hengelo, Netherlands |
|---|---|---|
| [21] | Appl. No. | 807,223 |
| [22] | Filed | Mar. 14, 1969 |
| [45] | Patented | June 8, 1971 |
| [73] | Assignee | N. V. Machinefabriek B & S<br>Bedrijven v. d. Woerdt, Hengelo,<br>Netherlands |
| [32] | Priority | Mar. 14, 1968 |
| [33] | | Netherlands |
| [31] | | 6803636 |

[54] APPARATUS FOR ARRESTING, RELEASING, CLASSIFYING AND ORIENTING ARTICLES ON A CONVEYOR
10 Claims, 7 Drawing Figs.

| [52] | U.S. Cl. | 209/74 |
|---|---|---|
| [51] | Int. Cl. | B07c 5/06 |

[50] Field of Search............................................ 209/73, 74, 90, 93, 108; 214/1 B2; 198/33

[56] References Cited
UNITED STATES PATENTS
2,593,627  4/1952  Stover ........................ 198/33(.4)

*Primary Examiner*—Allen N. Knowles
*Attorney*—Young and Thompson

ABSTRACT: Articles on a conveyor are stopped by or passed through a V-shaped funnel according to their size and shape. A gripper at one end or the other of the funnel grasps and releases articles detained by the funnel. The gripper and funnel can be rotated to reorient and then release a misoriented article. Only articles of the correct size and shape and orientation continue to be conveyed, while all other articles are removed from the conveyor or reoriented.

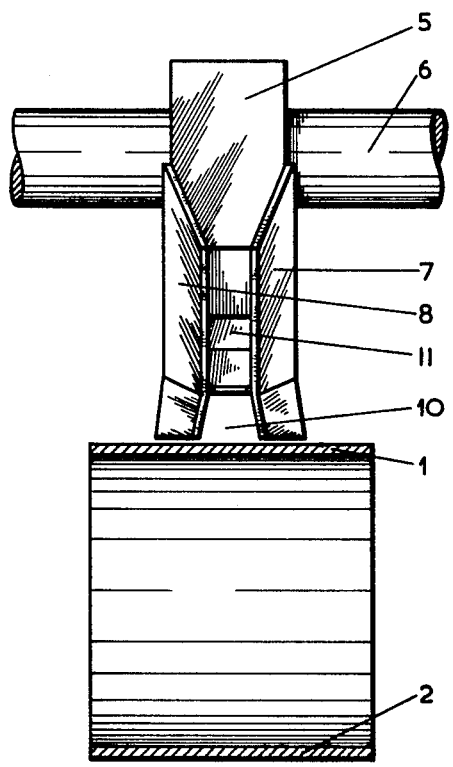
Fig_2
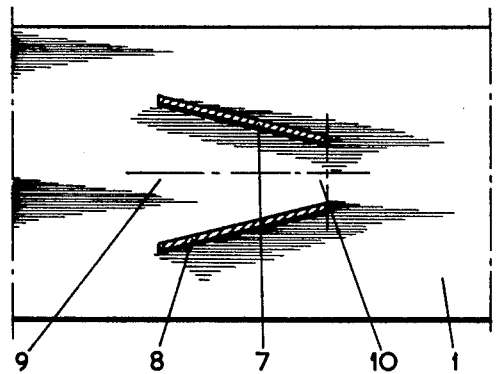
Fig_3

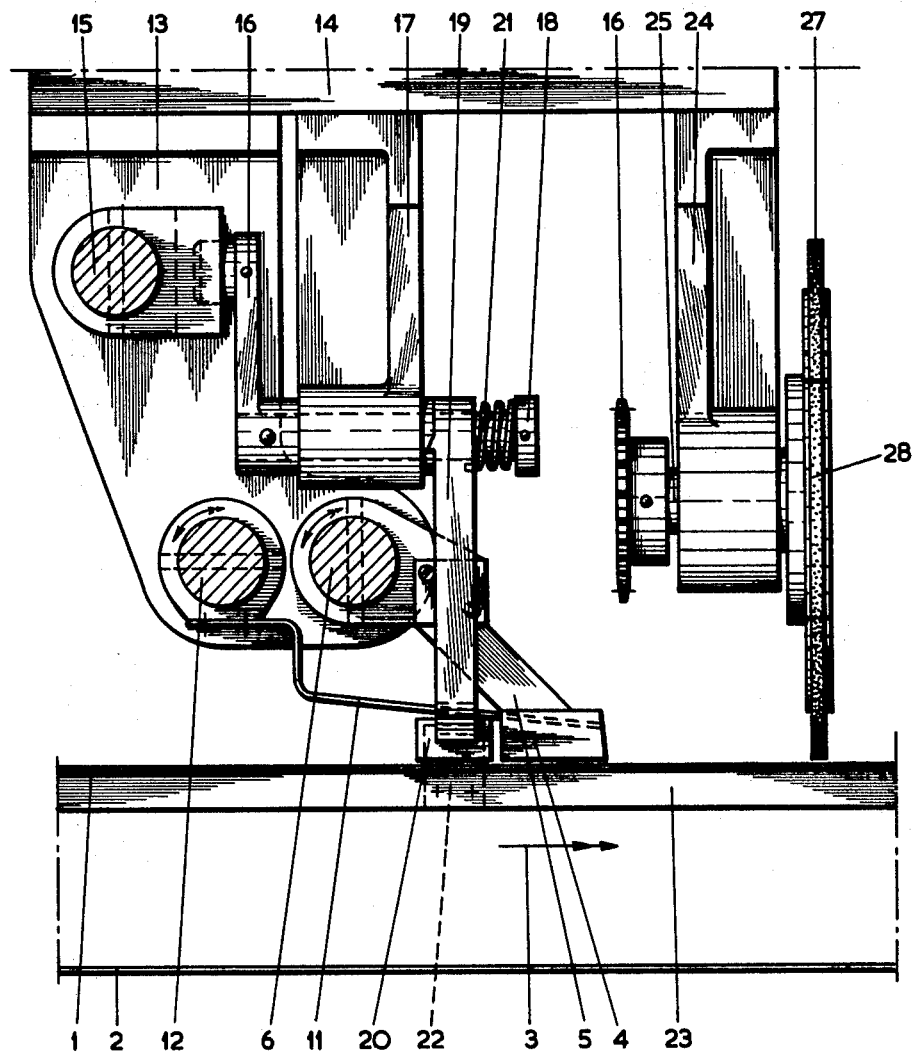

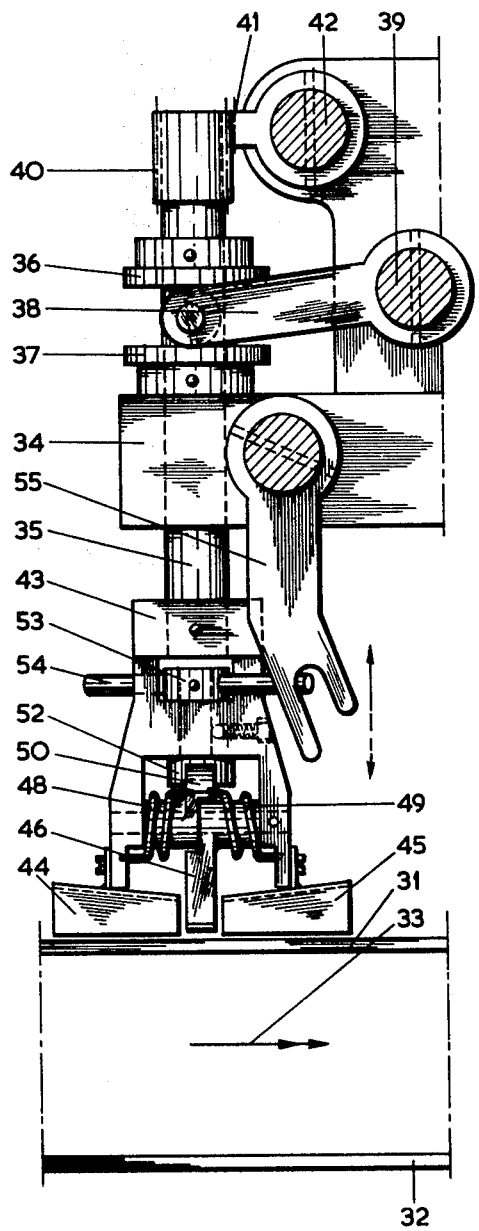
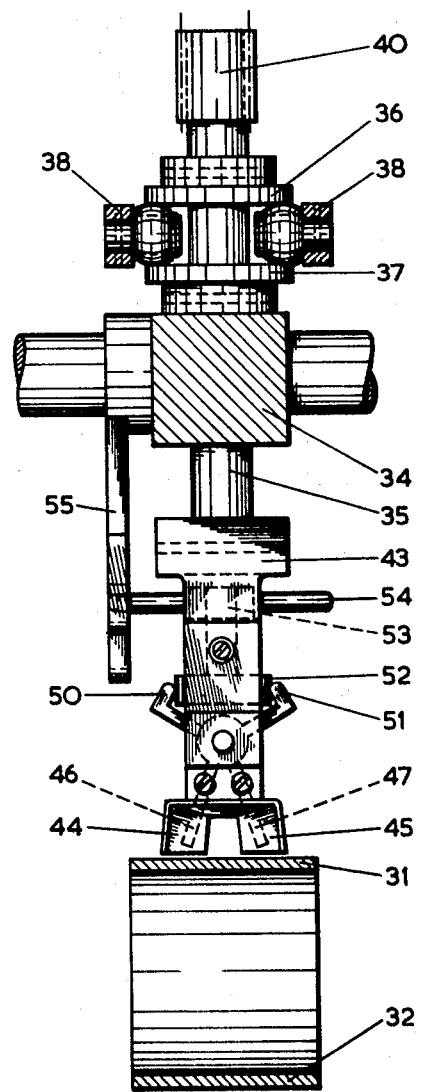

APPARATUS FOR ARRESTING, RELEASING, CLASSIFYING AND ORIENTING ARTICLES ON A CONVEYOR

The present invention relates to apparatus for arresting, releasing, classifying and orienting articles on a conveyor, to the end that only articles of the desired size and shape and orientation will continue to be conveyed by the conveyor, while all other articles will be removed from the conveyor or reoriented.

The present invention is useful in connection with articles that vary in size or shape or orientation, or that are admixed with undesired articles. However, the invention has particular utility in connection with shrimps and will be described and illustrated hereinafter in connection with an apparatus for handling shrimps.

It is an object of the present invention to provide apparatus which will retain and release articles of one size or shape or orientation, thereby to impart to such articles a timed relationship, but which will pass other articles whereby such articles do not have a timed relationship and can be removed from the conveyor in accordance with that lack of timed relationship.

Another object of the present invention is the provision of apparatus which will impart a desired orientation to misoriented articles on a conveyor.

Still another object of the present invention is the provision of a conveyor with means to classify articles on the conveyor as to size and/or shape.

Finally, it is an object of the present invention to provide such an apparatus which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIG. 2 is an end view of the structure shown in FIG. 1, viewed from the right of FIG. 1;

FIG. 3 is a section taken on the line III–III of FIG. 1;

FIG. 4 is a side elevational view, with parts in section, of another embodiment of the invention;

FIG. 6 is a side elevational view, with parts in section, showing still another embodiment of the invention; and FIG. 7 is an end view, with parts in section, of the structure shown in FIG. 6, viewed from the right of FIG. 6.

Figure 1:
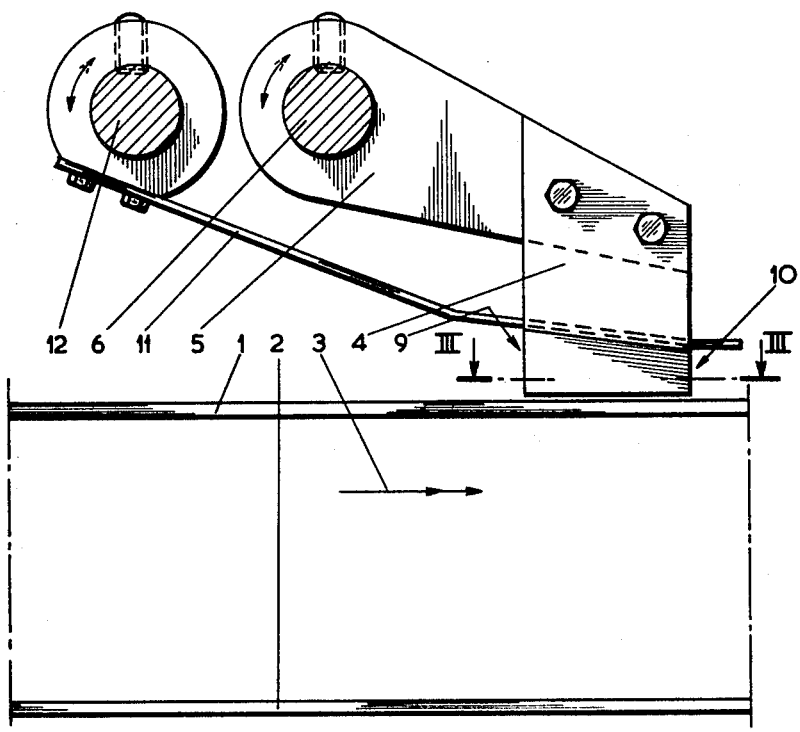
FIG. 1 is a side elevational view, with parts in section, of one embodiment of the invention.

Referring now to the drawings in greater detail, and first to the embodiment shown in FIGS. 1–3, there is shown an endless belt conveyor trained about and driven by end rolls (not shown) and having an upper conveying run 1 that moves to the right in the direction of the arrow 3 in FIG. 1 and a lower return run 2 that moves to the left as seen in FIG. 1. Shrimps to be handled are carried on the upper surface of upper run 1 to a catching member 4 which is mounted on an arm 5 that is fixedly secured to a shaft 6 that may be oscillated about its axis by means not shown. Catching member 4 consists of two upright plates 7 and 8 that define upstanding walls that converge in the direction of travel of upper run 1 in the shape of a V, with a wide opening 9 and a narrow outlet 10. Plates 7 and 8 also converge upwardly. An ejector 11 is disposed between plates 7 and 8 at a height above the conveyor such that shrimps can move therebeneath and is mounted for oscillation on an oscillatable shaft 23 that can be rotated by means not shown.

In operation, shrimps which are of proper size, that is, which are properly curled after boiling, will lodge between the plates 7 and 8 and be detained by catching member 4 until shaft 6 oscillates to swing catching member 4 upwardly. The properly shaped shrimps will then be freed to continue on the conveyor belt in predetermined timed relationship. As catching member 4 swings upwardly, ejector 11 remains behind until it is about level with the lower ends of plates 7 and 8, and then moves upwardly with catching member 4 by oscillation of shaft 12. Ejector 11 ensures that the shrimp will not remain in the raised catching member 4, as does also the upward convergence of plates 7 and 8. The parts 4 and 11 then return to their position shown in FIG. 1 to await the next shrimp.

But if the shrimp is not curled properly after boiling and is relatively straight, then it will pass between plates 7 and 8 and not be detained thereby, and can subsequently be separated because it is out of timed relationship. The shrimp heads and other relatively small pieces will also pass between plates 7 and 8 and be separable by virtue of their improperly timed relationship, that is, their improper position on the conveyor belt.

If desired, a flat or curved wall can interconnnect plates 7 and 8 to close the narrow end of catching member 4. In this latter case, the catching member serves only to regulate the timing of the shrimps.

Figure 5:
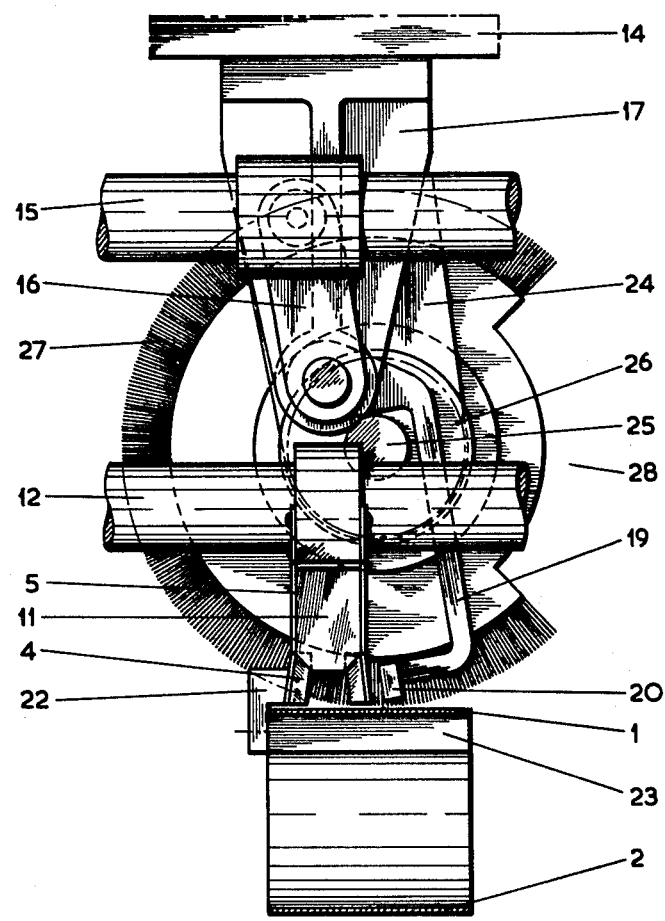
FIG. 5 is an end view of the structure shown in FIG. 4, viewed from the left of FIG. 4.

The embodiment of FIGS. 4 and 5 is like that of FIGS. 1–3, but includes the following additional structure:

The shafts 6 and 12 are carried by a bracket 13 that depends from a stationary frame 14. A shaft 15 is reciprocably carried by bracket 13 to oscillate a crank 16 that rotates a shaft 18 journaled in a bracket 17 that also depends from frame 14. Shaft 18 thus swings an arm 19 that has a gripper 20 at its lower end upstream or ahead of catching member 4 with respect to the direction of travel of upper run 1 of the conveyor belt. A torsion spring 21 acts between arm 19 and shaft 18 to limit the force with which gripper 20 can bear against a shrimp. Gripper 20 cooperates with a fixed gripper 22 secured to the side of support plate 23 of the upper run 1 of the conveyor.

Another bracket 24 depends from fixed frame 14 and carries a horizontal shaft 25 journaled therein parallel to but spaced above the upper run 1 of the conveyor. Shaft 25 carries a sprocket 26 which is driven by a drive chain (not shown) in timed relation with shafts 6, 12 and 15 and the belt conveyor. Mounted on and driven by the rear end of shaft 25 is a circular brush 27 having a recess 28 in the periphery thereof.

In operation, shrimps and perhaps also parts of shrimps are fed to upper run 1 of the belt conveyor in predetermined timed relationship with shafts 6, 12 and 15 and brush 27 and the speed of the belt itself. Thus, when a shrimp or part thereof enters catching member 4, then immediately afterward gripper 20 moves toward gripper 22 to grip the antennae of a shrimp of the proper size and shape. Catching member 4 then swings upwardly and the plate 11 immediately subsequently. The gripper 20 then moves back away from gripper 22 and releases the antennae of the shrimp, which is then carried by the conveyor belt through the recess 28 in the continuously rotating brush 27, the movement of the parts being timed to this end.

But if the shrimp or part of the shrimp is straight or too small, then it can pass through catching member 4; but because it has not been properly timed by the grippers 20, 22, it will miss the recess 28 and instead strike the bristles of the brush 27 and be discharged from the side of the conveyor. Similarly, if the shrimp is detained by catching member 4 but is of the wrong size so that its antennae are not caught by grippers 20, 22, then upon upward swinging of catching member 4 the shrimp is discharged in improperly timed relationship and again is brushed off the conveyor by brush 27.

In the embodiment of FIGS. 6 and 7, the endless belt conveyor has an upper run 31 and a lower run 32 with the upper run moving in the direction of the arrow 33 in FIG. 6. Fixed frame 34 is disposed above the conveyor belt and a vertical shaft 35 is rotatable and vertically reciprocable in frame 34 and carries spaced collars 36 and 37 between which are disposed rollers carried by a fork 38 that is secured to shaft 39 which may be oscillated to raise and lower shaft 35. Shaft 35 also carries gear teeth 40 at its upper end which mesh with a rack 41 carried by an axially reciprocable shaft 42, the shafts 39 and 42 both being carried by the frame 34. Axial reciprocation of shaft 42 thus rotates shaft 35.

At its lower end, shaft 35 has a support 43 fixed thereto, the lower end of support 43 fixedly carrying two V-shaped catching members 44 and 45 that are oppositely tapered relative to each other and whose narrow openings face each other. Between catching members 44 and 45 a gripper means is mounted comprising grippers 46 and 47 which are urged by springs 48 and 49 toward the closed position and whose opening and closing are controlled by means of a rotatable cam 52 engaging arms 50 and 51 on grippers 46 and 47. Cam 52, in turn, is journaled for rotation in and relative to support 43 by means of a vertical shaft 53 that at its upper end carries a transverse rod 54. A forked arm 55 is mounted on and swung by another oscillatable shaft carried by frame 34, thereby to swing rod 54 relative to support 43.

The operation of the device of FIGS. 6 and 7 is as follows:

When a shrimp enters catching member 44, then by the timed relationship of the parts, the forked arm 55 swings clockwise as seen in FIG. 6, thereby swinging rod 54 through 90° of arc, which closes the gripper members 46 and 47 together. If a shrimp is properly oriented, then it will be fully retained in catching member 44 and no portion of it will extend beyond catching member 44 and hence no portion of it will be gripped by the grippers 46 and 47. But is a shrimp is misoriented by 180°, then a portion of it will extend beyond catching member 44 and be gripped between grippers 46 and 47.

Shaft 39 then oscillates and shaft 42 reciprocates, so that shaft 35 is raised and rotated through 180°, whereby catching members 44 and 45 change positions with each other. Then shaft 39 oscillates again to lower shaft 35. Forked arm 55 has moved sufficiently far clockwise as seen in FIG. 6 that it does not interfere with rod 54 either during this vertical movement of rod 54 or the swinging movement of rod 54 through 180° with shaft 35.

With the assembly 44—47 again returned to a position just above the surface of the conveyor, forked arm 55 swings counterclockwise back to the position of FIG. 6, thereby engaging and swinging the rod 54 through 90° to open the gripping members 46, 47 to the position of FIGS. 6 and 7.

Thus a properly positioned shrimp moves onward with the conveyor belt as soon as the catching member 44 rises. But an improperly oriented shrimp is grasped by the grippers 46, 47, raised and rotated through 180°, and is then returned to the conveyor belt in properly oriented relationship and released in properly timed sequence.

The device of FIGS. 1—3 can of course be used in connection with a brush as in FIGS. 4 and 5, and the same is true of the apparatus of FIGS. 6 and 7. In this latter case, the parts are so timed that whatever is detained by catching member 44 will be released, either when that member rises or else when gripper members 46 and 47 open to release a reoriented shrimp, in properly timed relationship to pass through the recess in the periphery of the brush. On the other hand, pieces and other objects that pass through the catching members 44 and 45 and the open gripper members 46 and 47 without being detained are so timed that they will contact brush 27 and be deflected from the conveyor belt.

It will of course be understood that in all of the embodiments of this invention, the rotating and reciprocating and oscillating shafts and the belt conveyor are driven in timed relationship to each other by systems of gearing and cams and levers well known to persons having ordinary skill in the art, which accordingly need not be described in greater detail.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, one of plates 7 and 8 could be made parallel to the direction of movement of the upper run of the subjacent conveyor; and this parallel plate could then be moved perpendicular to its plane to slide an article laterally off the conveyor. Such modifications and variations are considered to be within the purview and scope of the present invention as defined by the appended claims.

I claim:

1. Apparatus for arresting and releasing articles, comprising a belt conveyor, an article-catching member disposed above the conveyor, the catching member comprising a pair of upstanding walls that converge in the direction of travel of the belt, and means vertically reciprocating the catching member relative to the belt.

2. Apparatus as claimed in claim 1, said catching member being open at its narrow end.

3. Apparatus as claimed in claim 1, said walls converging upwardly.

4. Apparatus as claimed in claim 1, and an ejector disposed between said walls a substantial distance above said belt, and means mounting said ejector for vertical movement relative to the walls and to the belt.

5. Apparatus as claimed in claim 2, and means beyond said catching member in the direction of travel of the conveyor belt for removing from the conveyor articles that pass through the narrow end of the catching member, the last named means passing articles detained and released by the catching member.

6. Apparatus as claimed in claim 5, said last named means comprising a brush that rotates above the conveyor belt and that has a recess in its periphery through which pass the articles released by the catching member.

7. Apparatus as claimed in claim 6, and means mounting said brush for rotation about a horizontal axis parallel to and disposed above the conveyor belt.

8. Apparatus as claimed in claim 1, and gripping means adjacent the wide end of the catching member for gripping portions of articles that extend out of the wide end of the catching member, and means for closing said gripping means and then raising said catching member and then opening and gripping means and then lowering said catching member.

9. Apparatus as claimed in claim 2, and gripping means adjacent the narrow end of said catching member, and means for closing said gripping means for gripping a portion of an article that extends through said narrow end of the catching member and for thereafter raising and rotating through 180° both said gripping means and said catching member and for thereafter lowering said gripping means and catching member and opening said gripping means.

10. Apparatus as claimed in claim 9, there being two said catching members arranged in line with each other on opposite sides of said gripping means with their narrow ends disposed adjacent each other.